C. D. SMITH & H. PATTERSON.
MATCH SPLINT MACHINE.
No. 15,393. Patented July 22, 1856.
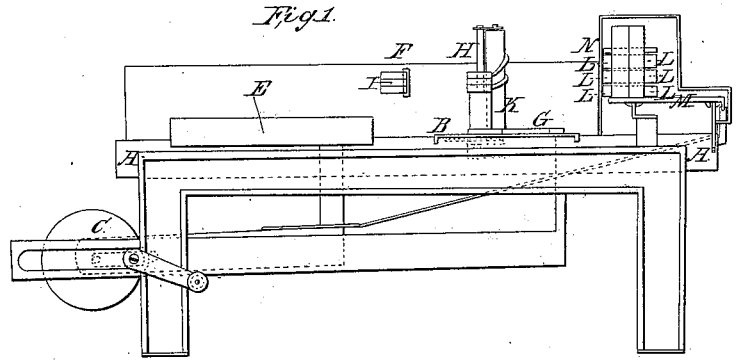
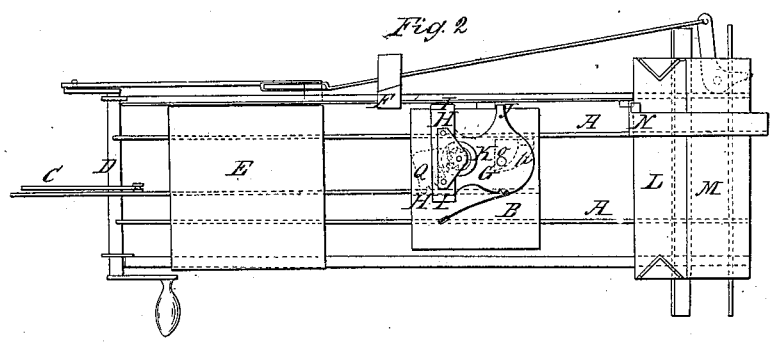
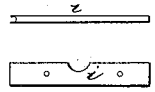

UNITED STATES PATENT OFFICE.

CALVIN D. SMITH AND HORACE PATTERSON, OF BALDWINVILLE, MASSACHUSETTS.

FRICTION-MATCH MACHINE.

Specification of Letters Patent No. 15,393, dated July 22, 1856.

*To all whom it may concern:*

Be it known that we, CALVIN D. SMITH and HORACE PATTERSON, of Baldwinville, in the county of Worcester and State of Massachusetts, have invented certain new and useful Improvements in Splint-Machines; and we do hereby declare that the following is a full, clear, and exact description of the construction and operation of the same, reference being had to the accompanying drawings and to the letters of reference marked thereon, in which drawings—

Figure 1 is a side elevation, Fig 2 is a top view and Fig. 3 shows some parts hereinafter to be described, the same letters denoting the same parts in all.

Our improvements relate to the transferring of the splints after they are cut (by the dies in the usual way) from the dies to the rack and placing them therein the rack being so constructed and arranged as to favor the same.

Machines have heretofore been made with passages or tubes leading from the dies to the rack in which the splints being cut force those ahead of them along the passages and into the rack. These for numerous objections have been laid aside and the pieces of the rack filled separately by hand, and the racks being made with notches on both sides of the pieces, when filled, clamped, and dipped, the removal of the splints is a delicate troublesome operation owing to some sticking in the upper and some in the lower notches or both, causing them to drop, or requiring them to be carefully picked out, as the nature of a match is such that it will not bear rough handling. Whereas by our improvements each splint is taken and placed in the rack and after being dipped each piece of the rack will have them only on its upper side and can be handled with facility without danger.

To construct our improvements, upon the slides A A place a table B and give it motion (by means of the cam C on the shaft D or by equivalent means) so that it shall move with the block-holder E a short distance then it may move faster and return to place and rest a moment while the block-holder goes back past the planer and comes forward to the dies F, on B put the plate G with its two uprights H H to support the pieces I I I of which there should be as many as there are dies used the plate G having a motion on its center *o* and a projection J to control its position, the pieces I I I are made with a groove at the end fitted to just press on to the splints, after they pass the dies, and have a notch in which the elevator K works.

The rack we make of the separate pieces L, L, L, with grooves on one side or surface a little less in depth than the rise of the splints and wide enough for them to lay in without wedging and the ends of the partitions between the grooves on one side are pointed so as to make the mouths of the grooves funnel shaped, these pieces L, L, L, are supported on the table M between two uprights and pass under a supporter N which has thin lips to pass between each piece to separate them to allow the splints to pass in freely through the grooves.

The elevator K has screw like projections to play between the pieces I, I, I, each projection being of such inclination that on turning the elevator partly around one way it shall raise the piece above from a position on a level with the die to a level with the corresponding hole or piece of the rack, the upper ones requiring more motion than those below. To the end of K may be attached a pinion and the segment Q, be placed to gear into it and a pin or stud put in the segment to be operated by the cam P fixed beneath the table (or rotary motion may be given to the elevator by an arm operated by a similar cam).

The other parts of the machine may be of the common form and arrangements only giving the rack table the proper motion to bring an empty set of grooves as required.

The operation of making the splints is as in the common machine, the block having them sticking in the dies until making another set which forces out the first ones.

The motion of the table B on moving toward the dies brings the projections J against a stationary cam R so as to turn the plate G and press the pieces I I I onto the splints as the table B finishes its motion that way, at which point it rests until the block comes against the dies then moving with the same speed as the block holder until the splints are forced out of the dies and are left in the pieces I, I, I, the table B continuing its motion toward the rack motion is given to the elevator K (by its cam arrangement) which separates the pieces I, I, I, in time to enter the ends of the splints into the grooves, the enlarging of whose mouths insures their entering the last part of the motion of the table B toward the sack bringing a projection against a stationary cam which turns the plate C, casting off the pieces I, I, I from the splints leaving them in the sack and the backward motion of the table B reverses the action of the elevator K bringing the pieces I I I down to correspond with the dies. The sack on being clamped together the under surface of each piece presses on the splints in the one below it except the lower one and over the top one a plain piece is put before clamping making each set ready for dipping, the peculiar form of the sack pieces making them easily filled and giving the best control over them in running them when dipped, the nature of the notches making the operation of removing them laborious and dangerous in racks made after the old plan.

We do not claim any particular form or arrangement of parts, or number of splints made or carried at once; but

What we claim as new and desire to secure by Letters Patent is—

1. The table B with its plate G and pieces I I I, or their equivalents, to carry the splints from the dies and place them in the rack substantially as above set forth and described.

2. We claim the peculiar construction of the rack pieces L L L to facilitate their receiving the splints and for the better control of them as above described.

In testimony whereof we have hereunto set our hands in the presence of two witnesses.

CALVIN D. SMITH.
HORACE PATTERSON.

Witnesses:
SAM'L A. ARNOLD,
JAS. G. ARNOLD.